July 28, 1953 H. GOLDBERG 2,646,700
MACHINE TOOL
Filed July 21, 1948 5 Sheets-Sheet 1

INVENTOR.
Herman Goldberg,
BY Smith, Olsen & Baird,
Atty's.

July 28, 1953  H. GOLDBERG  2,646,700
MACHINE TOOL
Filed July 21, 1948  5 Sheets-Sheet 3

INVENTOR.
Herman Goldberg,
BY
Smith, Olsen & Baird,
Attys.

July 28, 1953 H. GOLDBERG 2,646,700
MACHINE TOOL
Filed July 21, 1948 5 Sheets-Sheet 4

Fig. 7

INVENTOR.
Herman Goldberg,
BY
Smith, Olsen & Baird,
Attys.

Patented July 28, 1953

2,646,700

UNITED STATES PATENT OFFICE 2,646,700

MACHINE TOOL

Herman Goldberg, Bartlett, Ill., assignor to Snow Manufacturing Company, Bellwood, Ill., a corporation of Illinois Application July 21, 1948, Serial No. 39,990

8 Claims. (Cl. 77—64)

This invention relates to improvements in drilling machines, tapping machines and other like machines wherein a rotating tool has relative axial movement with respect to one or a succession of work pieces adapted to be operated upon by the tool and in which each work piece must be properly positioned and held preliminary to each tool operation. Machines of that type are described and claimed in my copending applications, Serial No. 323,648, filed March 13, 1940, now Patent No. 2,472,967, issued June 14, 1949, and Serial No. 448,554, filed June 26, 1942, now Patent No. 2,472,968, issued June 14, 1949.

In the machines disclosed in said prior applications, the rotating tool is moved toward and from the work by compressed air so that it engages the work with a yielding pressure and means are provided for automatically retarding and then arresting the movement of the tool, whereby it is brought to rest just as it breaks through the work, thus greatly reducing the breakage of the tools. The tool is normally returned to its retracted position by a constantly applied low air pressure and is moved to and through the work on its working stroke by a higher air pressure which overcomes the low air pressure. It is necessary to position the work piece during the working stroke of the tool and to hold it during the operation of the tool. In the later one of said applications means are disclosed for gripping the work piece by compressed air operated means and for automatically ejecting the work piece when the operation of the tool is completed.

The principal object of the present invention is to provide a machine of the type referred to having means operated by compressed air or the like for moving the work piece to a plurality of different successive positions in each of which the work piece is operated upon by the tool. A further object of the invention is to provide indexing mechanism for positioning the work piece in proper relation to the tool in combination with means for automatically holding the work piece in each of those positions. Still another object of the invention is to provide a machine of the type referred to, comprising compressed air operated means for moving the tool, in combination with air operated indexing mechanism for positioning the work piece, air operated means for holding the work piece, and common control means for effecting the actuation of the tool, the operation of the indexing mechanism and the operation of the holding means. Other objects of the invention relate to various features of construction and arrangement which will appear more fully hereinafter.

The nature of the invention will be understood from the following specification taken with the accompanying drawings in which two forms of the invention are illustrated. In the drawings.

Although capable of being embodied in various forms of machine tools wherein a rotating tool has relative axial movement with respect to a workpiece, the invention has been illustrated in the accompanying drawings in connection with drilling and threading or tapping machines. In Figs. 1 to 7, inclusive, the invention has been illustrated in connection with a drilling machine wherein a work piece is operated upon by a drill in a plurality of successive positions for drilling holes in a plurality of different predetermined locations in the work piece. This form of the invention comprises an upright casing 25 carried by a base 26, resting upon a floor or other support, and carrying on its front face a cylinder block 27 provided with cylinders to which compressed air or the like is admitted for the purpose of producing forward and reverse strokes of a rotating drill 28 carried by the rotating chuck 29 mounted at the lower end of the drill spindle. The drill 28 is adapted to operate upon a work piece 30 mounted in a work support 31 which comprises an indexing device 32 and a holding device 33. The indexing device is adapted to be operated by compressed air or the like to rotate the work piece 30 at predetermined intervals and the holding device 33 is adapted to be operated by compressed air to hold the work piece in each of the positions to which it is adjusted by the indexing device 32. The devices 32 and 33 are operated in proper timed relation to the actuation of the compressed air mechanism for causing the drill 28 to move through a downward or forward stroke.

The drill spindle by which the drill 28 is carried is mounted for movement with a pressure platen 45. This pressure platen is actuated through forward and reverse strokes by compressed air admitted to the cylinders of the cylinder block 27 through a valve block 46 mounted on the front face of the cylinder block. The valve block 46 contains the dashpot mechanism by which the movement of the tool is retarded and then arrested as it passes through the work. The drill spindle is adapted to be rotated by driving connections extending from an electric motor 48 mounted in the upper part of the casing 25, and supplied with electric connections leading to the interior of the casing from an external fitting 49 shown in Fig. 2. The shaft of the motor 48 has fixed thereon a pulley 50 of the truncated variety, having a plurality of grooves of different diameters adapted to be engaged by the belt 51 which extends around another oppositely arranged pulley 52 having grooves of different diameters. By shifting the belt from one pair of grooves to another pair on the two pulleys 50 and 52, the speed of rotation of the drill spindle, upon which the pulley 52 is mounted, may be regulated as desired and this regulation may, of course, be coupled with adjustments of the speed of the motor 48.

Figure 7:
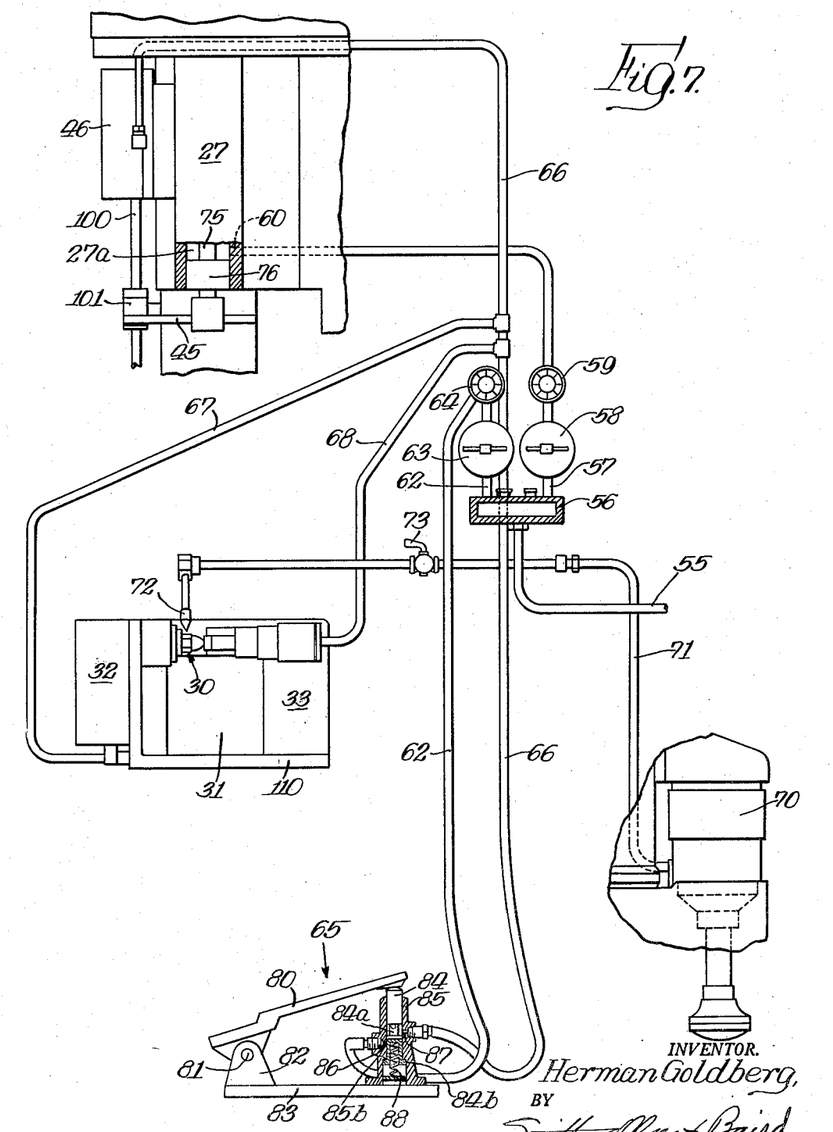
Fig. 7 shows a somewhat diagrammatic view of the connections of the compressed air operated actuating means with the cylinders by which the tool is moved and with the indexing mechanism and the holding device by which the work piece is moved and held.

As shown particularly in Fig. 7, a supply pipe 55 leads from an air compressor or the like to the chamber of a casing 56 which supplies air under pressure to all of the different parts of the apparatus. A pipe 57 leads from this casing through a pressure regulator 58 and a pressure gauge 59 to the lower ends of the cylinders 27a which are formed in the cylinder block 27, opening therein through ports 60 which are shown particularly in Fig. 3. In this way compressed air having a relatively low pressure is supplied constantly to the lower ends of the cylinders 27a to act normally to retract the tool 28 from the work. Another supply pipe 62 leads from the casing 56 through a pressure regulator 63 and a pressure gauge 64 to a foot operated valve 65. Another pipe 66 leads from this foot operated valve to the upper ends of the cylinders 27a and when the foot valve is operated to admit compressed air, at a relatively high pressure, to the pipe 66, the cylinder mechanism is actuated to effect a downward or forward stroke of the tool.

From the pipe 66, a pipe 67 leads to the indexing device 32 previously referred to and another pipe 68 leads from the pipe 66 to the holding device 33 previously mentioned. Thus, the actuation of the foot valve 65 serves not only to actuate the cylinder mechanism to produce the forward stroke of the tool but also to actuate the indexing mechanism and the holding device by which the work piece is moved to different successive positions and held in those positions while the tool is operating.

The electric circuit which is connected to the motor 48 for effecting the rotation of the tool may also supply electric current to another motor adapted to operate a pump 70, shown in Fig. 7, which supplies oil under pressure through a pipe 71 and a nozzle 72 to the work piece 30 for the purpose of cooling the drill and the work piece during the drilling operation. The flow of oil through the pipe 71 may be regulated by a valve 73.

Figures 1, 2:
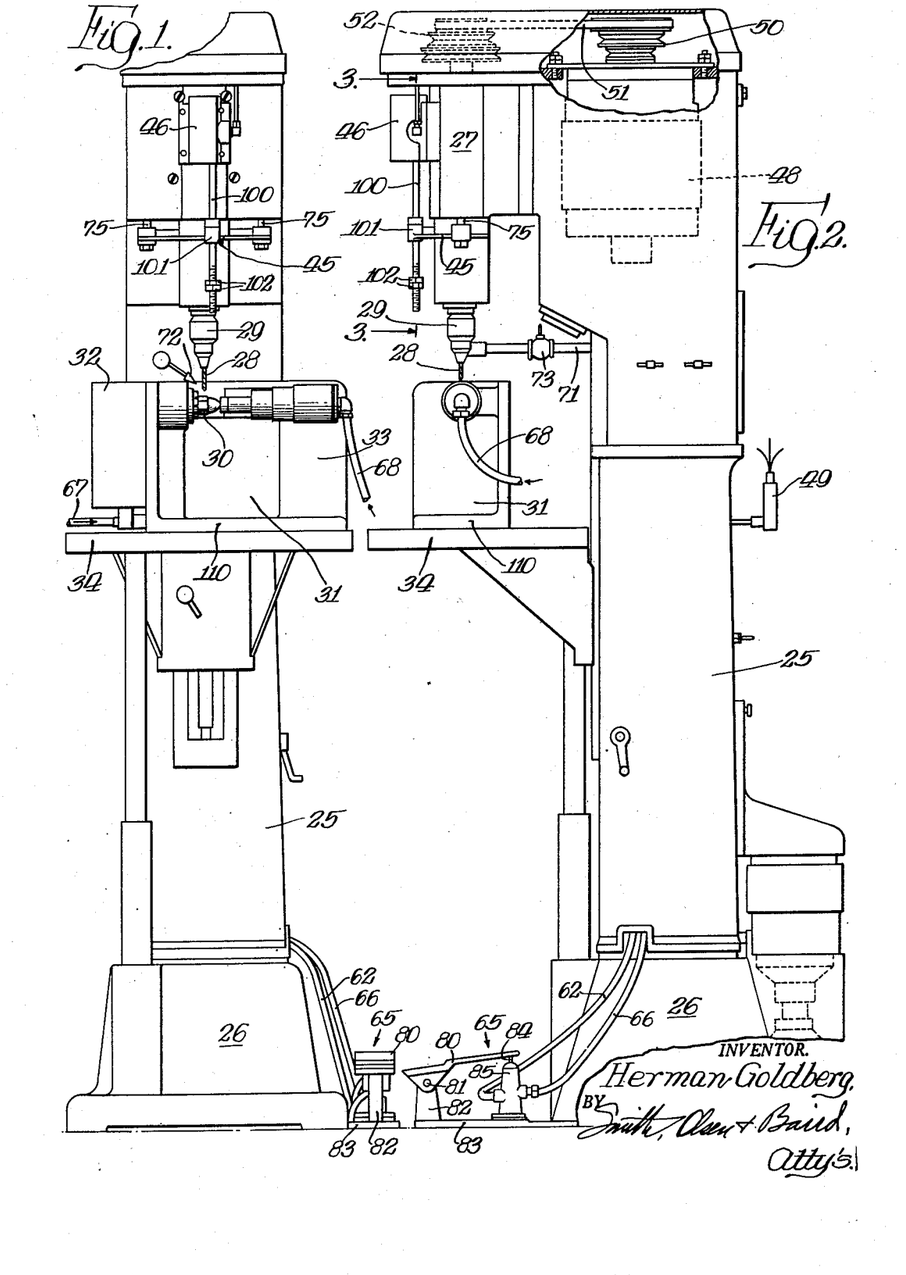
Figure 1 shows a front elevation of a drilling machine embodying the features of the present invention.
Fig. 2 shows a side elevation of the machine illustrated in Fig. 1.
Figure 3:
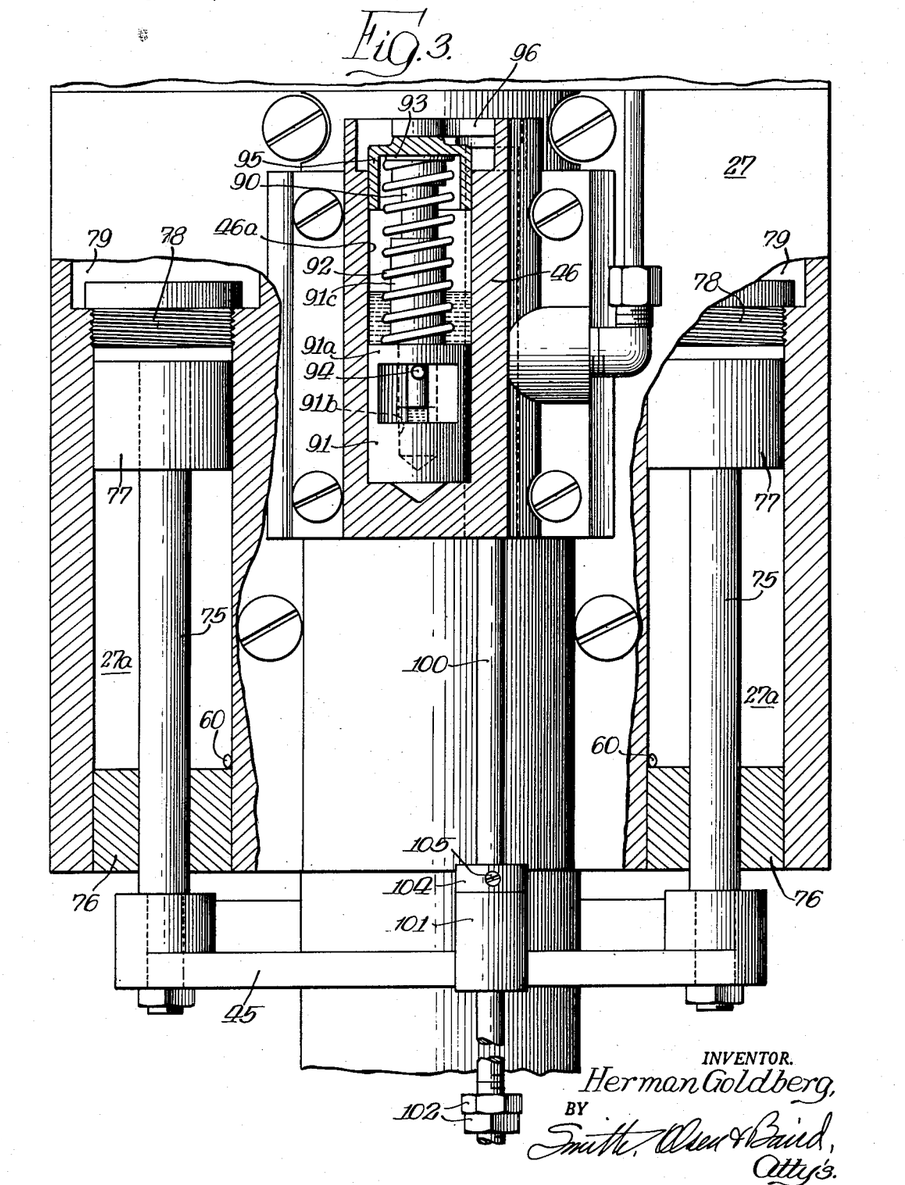
Fig. 3 shows an enlarged vertical section taken on the line 3—3 of Fig. 2 illustrating the cylinder mechanism by which the rotating tool is moved axially and the dashpot mechanism by which the movement of the tool is retarded and then arrested as it moves through the work.

The pressure platen 45 is illustrated, particularly in Fig. 3, as being connected at its ends with piston rods 75 which are mounted to reciprocate in apertures formed in the plugs 76 which form the lower ends of the cylinders 27a. The piston rods 75 have pistons 77 secured thereto to reciprocate in the cylinders and the low pressure air which is admitted to the lower ends of the cylinders 27a through the ports 60 operates normally to move the pistons 77 upwardly to the positions shown in Fig. 3, thereby retracting the tool 28 from the work. The upper ends of the cylinders 27a are closed by screw threaded plugs 78 to which access may be had through recesses 79 which are formed in the upper end of the cylinder block. When the pistons 77 are in their uppermost positions, their upper faces are spaced somewhat from the plugs 78 and when high pressure air is admitted to these spaces, from the supply pipe 66, through passages, not illustrated, which are formed in the cylinder wall and in the valve block 46, the pistons 77 are moved downwardly against the low pressure air in the lower ends of the cylinders, thus producing a forward or working stroke of the tool. The admission of air having a relatively high pressure to the upper ends of the cylinders 27a is controlled by the foot operated valve 65 which comprises a pedal 80 pivoted at 81 on a bracket 82 carried by the base plate 83. The pedal 80 rests at its free end upon a valve plunger 84 mounted to reciprocate in the cylindrical bore of a valve casing 85 which is secured on the plate 83. The supply pipe 62, leading from the casing 56, is connected to the interior of the valve casing 85 through a port 86 to communicate with an annular groove 84a formed in the peripheral surface of the valve member 84. The pipe 66 by which the high pressure air is conveyed to the cylinder block, is attached to the valve casing 85 and arranged to communicate with the annular groove 84a through a port 87. The valve plunger 84 is normally moved to an upper position by a coil spring 88 engaging a recess in the bottom thereof and resting upon the plate 83, thus causing an annular flange 84b on the valve member to seat against an annular shoulder 85b formed on the valve casing. When the valve member 84 is in its depressed position, the annular groove 84a establishes a communication between the ports 86 and 87 so that compressed air then flows from the pipe 62 to the pipe 66 to be conveyed by the latter pipe to the upper ends of the cylinders 27a. When the pressure on the pedal 80 is released, the valve member 84 is moved upwardly by the spring 88 thereby shutting off the flow of air from the supply pipe 62 and establishing a communication between the port 87 and an exhaust port formed in the wall of the valve casing 85 so that the air in the upper ends of the cylinders 27a, above the pistons 77, may then be exhausted to the atmosphere, thereby allowing the pistons 77 to be returned to their normal upward positions under the influence of the low pressure air which is constantly supplied to the lower ends of the cylinders 27a.

The downward or forward stroke of the tool is cushioned, particularly toward the end of the stroke, by the further compression of the low pressure air in the lower ends of the cylinders 27a under the influence of the high pressure air acting upon the upper faces of the pistons 77. In addition, this machine embodies the dashpot mechanism, disclosed in said prior applications, for bringing about a gradually increasing retardation of the movement of the tool as it passes through the work and for finally arresting the movement of the tool altogether as it breaks through the work, thus greatly reducing the danger of injury to the tools. This dashpot mechanism comprises a cylinder 46a formed in the valve block 46 and having mounted therein a plunger 90 mounted to reciprocate in the upper wall 91a of a cage-like member 91 mounted in the lower end of the bore. The member 91 has formed in the lower part thereof a well 91b adapted to receive the lower end of the plunger 90 when the plunger is depressed. The lower portion of the cylinder 46a is filled with oil and this oil occupies the well 91b which has its outer wall slightly flared in an upward direction so that the upper portion of the well is slightly larger in area than the area of the cylindrical plunger 90, whereas the lower part of the well is of the same diameter as the plunger 90. As the plunger moves downwardly into the well, the oil escapes during the first portion of this movement but offers a gradually increasing resistance to the movement of the plunger until, finally, there is no passage for the escape of oil about the plunger and the remaining oil in the well is completely trapped, thus bringing the plunger to rest.

The foregoing action of the plunger 90 in gradually entrapping a quantity of oil in the well 91b is utilized for bringing about the gradually increasing retardation of the movement of the tool and a final arresting of that movement. The plunger 90 is normally moved in an upward direction by a coil spring 92 mounted around a sleeve 91c formed on the member 91 in which the plunger is slidably mounted. This coil spring engages a flange on the collar 93 which is secured to the upper end of the plunger so that the spring normally moves the plunger to its upper position determined by the engagement of a pin 94 fixed in the plunger and adapted to engage the top wall 91a of the cage-like member 91. An inverted cup-shaped member 95 fits over the collar 93 and reciprocates within the upper end of the cylinder 46a. This cap member is engaged by an actuating arm 96 fixed upon the upper end of an operating rod 100 which is slidably mounted in a cylindrical aperture formed in the valve block 46. The rod 100 slidably engages a sleeve 101 which is formed as a part of the pressure platen 45, as shown particularly in Fig. 3, and the movement of the pressure platen is utilized to actuate the rod 100 and thereby control the operation of the dashpot mechanism. When the pressure platen 45 moves downwardly during the forward stroke of the tool 28, the sleeve 101 engages the uppermost one of a pair of nuts 102 which are mounted in a predetermined position on the lower threaded portion of the rod 100. When this occurs, the arm 96 attached to the upper end of the rod 100 depresses the plunger 90 against the compression of the spring 92, thereby moving the plunger downwardly to cause it to bring about the gradual retardation of the movement of the tool and finally to arrest the movement of the tool altogether. The nuts 102 are so adjusted on the rod 100 that this gradual retardation begins at the desired point during the movement of the tool, either at the instant when the tool engages the work or after a desired predetermined movement of the tool through the work and the adjustment is such that the final arresting of the movement of the tool will take place just as the drill has broken through the work. When the tool is thus stopped, the operator releases the pressure on the foot pedal valve 65, thereby allowing the air in the upper ends of the cylinders 27a to be exhausted and permitting the tool to be retracted under the influence of the constantly applied low pressure air acting upon the lower faces of the pistons 77. During this upward movement of the pistons and the corresponding upward movement of the pressure platen 45, the sleeve 101 carried by the pressure platen ultimately engages a collar 104 which is secured on the rod 100 by means of a setscrew 105 so that the rod 100 is thereby elevated with a corresponding elevation of the arm 96, thus permitting the plunger 90 to be restored to its initial position under the influence of the spring 92.

At the same time that the high pressure air is admitted to the upper ends of the cylinders 27a to effect a downward or forward stroke of the tool 28, the indexing device 32 and the holding device 33 are actuated by the compressed air operated means previously referred to. These two devices are embodied in the work support 31 carried by the table 34 which is mounted for vertical adjustment on the front face of the casing 25 so that the work piece may be properly positioned to be engaged by the tool 28 at the desired point in the travel of the tool. The work support 31 comprises a base plate 110 secured on the work table 34 and comprising an upwardly extending standard 111, having associated therewith the principal parts of the indexing mechanism, and another upwardly extending standard 112 with which are associated the parts of the work holding device. The standard 111 carries at its upper end a cylindrical bearing member 114 which has journaled therein the spindle 115 by which the work piece 30 is carried. This spindle has secured to one end portion thereof a collar 116 which bears against the end face of the bearing member 114 and this collar has secured thereto a work receiving member or chuck 117 in which the work piece 30 is seated. This chuck 117 has a recess which receives the base of the hexagonal portion 30a of the work piece and around the margin of this recess the member 117 is notched as shown at 117a to receive the corners of the hexagonal portion 30a so that the member 30 is held against rotation with respect to the spindle when it is in position in the chuck.

The work piece 30 has a dome-shaped head portion 30b adapted to be engaged by the holding device 33 as hereinafter described and, in the operation of the machine, the drill 28 is adapted to drill a centrally located hole 30c through each face of the hexagonal base portion 30a. In this instance, the work piece 30 is in the form of an internally threaded nut and the holes 30c extend through the walls of the hexagonal portion into the socket of the nut.

At the other end of the bearing member 114 the spindle 115 has secured thereon a ratchet wheel 118 provided with a plurality of notches 118a. For the purpose of maintaining the annular flange or collar 116 in tight frictional engagement with the end face of the bearing member 114, at all times, so that there will be no accidental rotation of the work spindle 115, the ratchet wheel 118 is engaged on its inner face by one or more pins 119 which are mounted in recesses in the bearing member 114 extending parallel to the axis of the spindle and which are actuated by coil springs 120 mounted in these recesses so that they bear against the face of the ratchet wheel and thus hold the collar 116 in contact with the bearing member.

The ratchet wheel 118 is adapted to be intermittently rotated by means of a pawl 122 pivotally mounted on a pin 123 carried by an actuating lever 125 pivoted on the spindle 115 adjacent to the ratchet wheel. A large washer 126 is mounted on the spindle to bear against the face of the operating lever opposite that which is engaged by the ratchet wheel and this collar is held in place by a pair of nuts 127 engaging the threaded end portion of the spindle. The pawl 122 is normally moved into engagement with the periphery of the ratchet wheel by a spring 129 which is mounted on the pin 123 with one extremity hooked around the edge of the lever 125 and the other extremity hooked around the pawl. The ratchet wheel has the same number of notches 118a as the work piece 30 has flat faces to be drilled and each time the spindle is rotated through an angular distance represented by the spacing of two of the notches 118a, the work piece 30 is rotated to bring a new flat face of its hexagonal portion 30a into a plane extending at right angles to the direction of travel of the drill 28.

Figure 5:
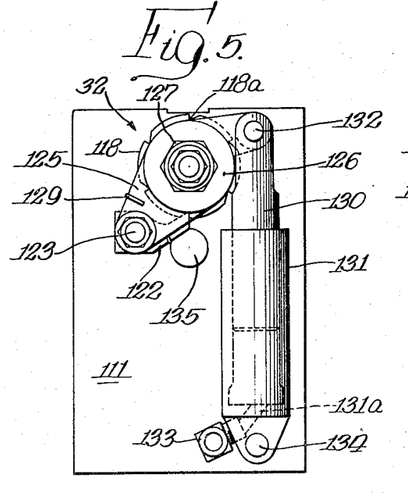
Fig. 5 shows an end elevation of the apparatus illustrated in Fig. 4, looking toward the right as viewed in Fig. 4 with the compressed air operated means of this device in its operated position.
Figure 6:
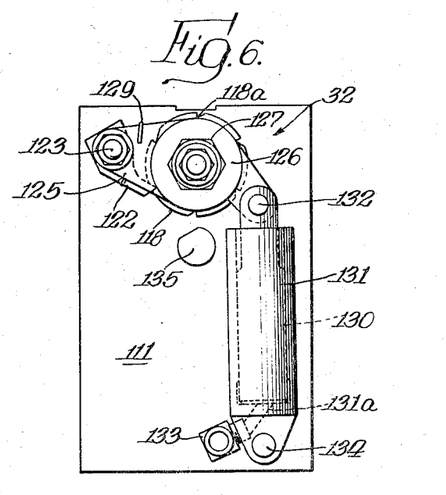
Fig. 6 shows an end elevation similar to that of Fig. 5 with the compressed air operated means in its retracted position.

The lever 125 is actuated to effect a feeding movement of the ratchet wheel 118 by means of a plunger 130 mounted in a cylinder 131 and pivotally connected at 132 to one arm of the lever 125 opposite that to which the pawl 122 is attached. The cylinder 131 is open at its upper end to receive the plunger or piston 130 and is closed at its lower end except for an inlet port 131a which communicates through a fitting 133 with the pipe 67 by which compressed air is supplied to the indexing device. The cylinder 131 is pivoted at 134 on the end face of the standard 111 to permit the oscillation of the cylinder during the actuation of the ratchet wheel. When the foot pedal valve 65 is actuated to admit compressed air to the cylinders 27a to produce a forward or downward stroke of the drill 28, compressed air is simultaneously admitted through the pipe 67 to the cylinder 131, thus moving the plunger 130 upwardly and rotating the spindle through an angular distance equal to one-sixth of its circumference. This indexing movement is limited by the engagement of the pawl 122 with a stop pin 135 which is fixed on the end face of the standard 111, as shown in Fig. 5. The setting of the base plate 110 and the table 34 with respect to the tool 28 is so adjusted that, even though compressed air is admitted to the upper ends of the cylinders 27a and to the cylinder 131 simultaneously, the plunger 130 will complete the angular movement of the work piece 30 and position a new face of the work piece beneath the drill before the drill has traveled far enough to engage that face. The movement of the drill then continues with the resulting formation of one of the holes 30c and when the drilling operation has been completed and the foot pedal operated valve 65 has been operated to permit the exhaust of the compressed air from the upper ends of the cylinders 27a, the drill 28 is withdrawn from the work piece by the action of the low pressure air on the lower faces of the pistons 77 and, at the same time, the air is exhausted from the lower end of the cylinder 131 so that the plunger 130 and the lever 125 are then restored to their initial positions by the action of a coil spring 137 which is attached at its upper end to the pivot pin 132 and at its lower end to the pin 134 upon which the cylinder 131 is mounted. The spring, in thus returning the plunger 130 to its lower position, rotates the lever 125 to a position where the pawl 122 engages the next following notch 118a in the periphery of the ratchet wheel in readiness for the next indexing movement when the foot pedal operated valve 65 is again actuated.

The holding device 33 carried by the standard 112 comprises a cylinder 140 formed integrally with or attached to the upper end of the standard and having mounted therein a holding plunger 141. The inner end of this plunger is provided with a hard metal socketed member 141a adapted to receive and conform to the surface configuration of the head portion 30a of the work piece so that when the plunger 141 is moved toward the left, as viewed in Fig. 4, it engages the tip of the head portion of the work piece and thus holds the work piece in position in the chuck 117.

The plunger 141 is moved into engagement with the work piece by compressed air admitted from the pipe 68 to the chamber 140a in which the enlarged outer end of the plunger 141 is located. This end of the cylinder 140 is closed by a screw threaded cap or head 142 and the supply pipe 68 is connected through this head to the chamber 140a through a fitting 143. The plunger 141 has an enlarged ring or shoulder 141a formed thereon within the chamber 140a and a packing ring 144 is attached to this shoulder to form an air tight connection between the plunger and the wall of the chamber 140a. When compressed air is admitted to the chamber 140a, the plunger 141 is moved to the holding position previously described wherein it engages the work piece 30. This occurs when the foot pedal operated valve 65 is actuated to effect a downward movement of the tool and the arrangement is such that the plunger 141 engages the work piece to hold it before the drill 28 engages the work piece. The plunger 141 then remains in that position engaging the work piece until all of the faces of the hexagonal nut 30 have been drilled, although there will be an application of air pressure to the end face of the plunger 142 only upon each actuation of the foot pedal valve 65. At the end of the drilling of the six faces of the nut, the plunger 141 is retracted manually by a pin 145 which is fixed in the plunger and arranged to slide in a slot 140b formed in the under side of the cylinder 140.

Figure 4:
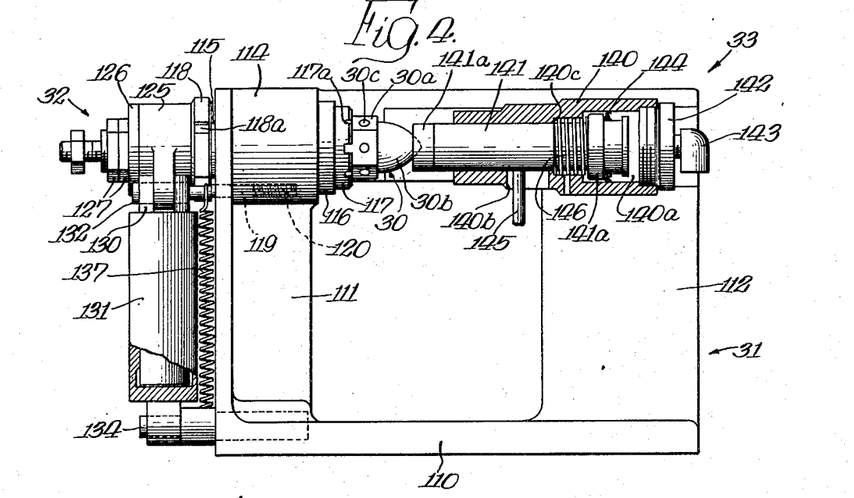
Fig. 4 shows an enlarged side elevation and partial vertical section through the work support illustrated in Figs. 1 and 2.

In Fig. 4 of the drawings, the holding device is shown as comprising a coil spring 146 which surrounds the plunger 141 with one end engaging the shoulder or ring 141a and with the other end engaging a shoulder 140c formed on the cylinder. This spring would normally return the plunger 141 to its retracted position each time that the air pressure in the chamber 140a is relieved but, when operating upon a work piece, such as the work piece 30, where several operations are to be performed upon the same member in different positions of it, it is preferable to remove the spring 146 and allow the plunger to remain in its forward position, after its first actuation by compressed air, until all of the operations on that work piece have been completed.

Figures 8, 9, 10:
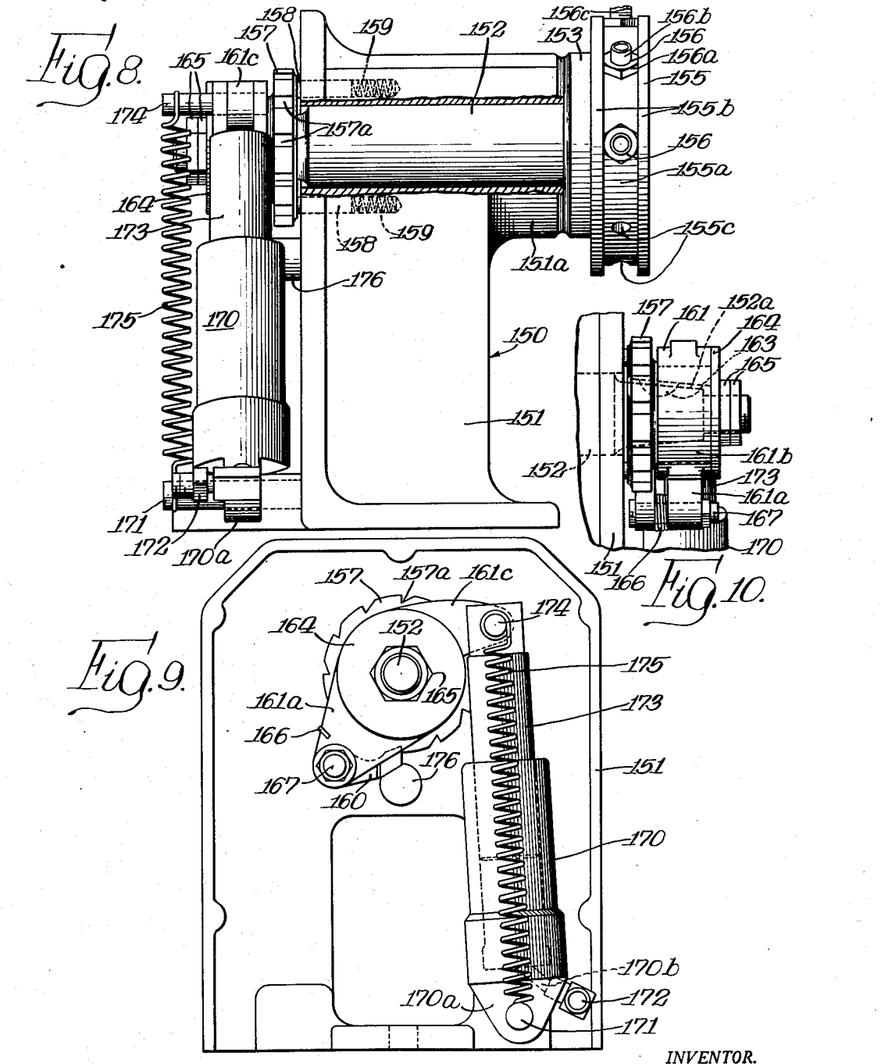
Fig. 8 shows a partial side elevation of and partial vertical section through a modified form of indexing mechanism adapted for use in operating upon a type of work piece different from that shown in Figs. 1, 2 and 4.
Fig. 9 shows an end elevation of the apparatus shown in Fig. 8, looking toward the right as viewed in Fig. 8.
Fig. 10 shows a partial side elevation of the device illustrated in Fig. 9, looking toward the right as viewed in Fig. 9.

The indexing mechanism of the present invention may have various forms adapted to be employed with different shapes and sizes of work pieces to be operated upon and other tools may be substituted for the drill 28 in accordance with the character of the work being done. In Figs. 8, 9 and 10 of the drawings, there is illustrated a modified form of indexing device 150 which is adapted to be employed when the machine is being used to form external threads upon a series of work pieces which are to be moved in succession into position to be engaged by the tool. This indexing device 150 comprises a standard 151 adapted to be secured upon the work table 34 of the machine and having journaled in the upper part thereof a shaft 152 arranged to extend horizontally with a collar 153 fixed on one end thereof. The collar 153 has secured thereto a work holding ring 155 comprising a central cylindrical portion 155a bounded by annular flanges 155b. The cylindrical portion 155a has formed therein a plurality of equally spaced radial recesses 155c of cylindrical form which are adapted to receive the inner annular flanges of the work pieces 156. Each work piece has this inner tubular portion adapted to fit into one of the recesses 155c, together with a hexagonal portion 156a and an outer tubular portion 156b upon which threads 156c are adapted to be formed by the operation of the thread cutting tool which is mounted on the tool holder 29 of the machine in place of the drill 28. In this instance, the tool is in the form of a chuck having a central recess into which extend a plurality of radially adjustable thread cutters and when the tool is lowered these thread cutters operate upon the tubular projection 156b to form the threads 156c. The tool operates upon the work piece 156 when it is in the uppermost position as shown in Fig. 8 and the uncut work pieces are adapted to be placed in the recesses 155c in positions which are removed one or two spaces from the uppermost position. Thus, the workman can place the work pieces on the work holder 155 during its intermittent rotation and, after the threads have been formed on a work piece and the rotation of the work holder 155 continues, the finished work pieces automatically drop off by gravity and may be collected in a suitable container mounted beneath the work holder.

As in the form of the invention previously described, the intermittent rotation of the shaft 152 and of the work holder 155 is effected by compressed air and pawl and ratchet mechanism. In this case, a ratchet wheel 157, provided with a plurality of notches 157a, is fixed upon the end of the shaft 152 and is engaged on its inner face by a plurality of pins 158 which are mounted in tubular bores formed in the standard 151 to be engaged by coil springs 159 mounted in the inner ends of these bores so that the collar or disc 153 is maintained at all times in tight frictional engagement with the end face of the bearing portion 151a of the standard in which the shaft is journaled. The accidental rotation of the work holder is thus prevented.

The ratchet wheel 157 is actuated by a pawl 160 mounted upon one arm 161a of a lever 161 which is fixed upon the reduced end of the shaft 152. This end portion 152a of the shaft is tapered as shown in Fig. 10 to be fitted by the hub portion 161b of the lever and also by the tapered bore of the ratchet wheel and both of these parts and held against rotation by a key 163. A collar 164 fits on the threaded end of the shaft against the face of the lever 161 and the parts are held in assembled relationship on the shaft by a pair of nuts 165. The pawl 160 is normally moved into engagement with the ratchet wheel by means of a spring 166 which is mounted around the stud 167 by which the pawl is pivoted on the lever with one end of the spring hooked over the edge of the lever and the other end hooked over the edge of the pawl so that the pawl is moved inwardly to engage the notches 157a. These notches are spaced apart to agree with the spaced relation of the work piece receiving recesses 155c in the work holder.

The intermittent rotation of the ratchet wheel 157 is effected by compressed air supplied to a cylinder 170 which is closed at its lower end and provided with a downwardly extending flange 170a pivoted on a pin 171 which is fixed in the lower end of the standard 151. Compressed air is supplied to the lower end of the cylinder 170 through a passage 170b and a fitting 172 connected to the end of a supply pipe corresponding to the supply pipe 67 previously described so that compressed air is furnished to the cylinder 170 each time that compressed air is supplied to the upper ends of the cylinders 27a for effecting a downward or forward stroke of the tool. A plunger 173 is mounted to reciprocate in the cylinder 170 and is pivotally connected at its upper end by a pin 174 to the arm 161c of the actuating lever. A coil spring 175 extends between the pin 174 and the pin 171 so that the plunger 173 is normally moved to its lower position in the cylinder 170 to effect thereby the retraction of the pawl 160 from engagement with one notch 157a to a position where it engages the next notch of the series.

When compressed air is admitted to the cylinder 170 simultaneously with the admission of compressed air to the upper ends of the cylinders 27a, the plunger 173 is moved upwardly against the tension of the spring 175, thereby moving the lever 161 angularly and causing the rotation of the ratchet wheel 157 and of the work holder 155 through an angular distance corresponding to the distance between two of the work piece receiving recesses 155c. The extent of this angular rotation of the ratchet wheel 157 is limited by the engagement of the pawl 160 with a stop pin 176 fixed on the standard 151, as shown in Fig. 9. When the pawl 160 engages the pin 176 one of the work pieces 156 will be positioned at the top of the work holder 155 in position to be engaged by the thread cutting tool mounted on the rotating spindle of the machine and the spaced relation of the tool and the work holder will be adjusted so that the uncut work piece will reach the operative position immediately before it is engaged by the thread cutting tool. While the cutting operation is proceeding, the operator will place an additional work piece in one of the recesses 155c of the work holder. In this way, the fluid pressure operated indexing mechanism is utilized for moving successively to operative position between the rotating tool a series of similar work pieces which are to be operated upon by the tool and after the threads have been cut in each work piece it moves downwardly during the next increments of movement of the work holder until finally it drops off by gravity.

Although two embodiments of the present invention have been shown and described by way of illustration, it will be understood that it may be constructed in various other forms which come within the scope of the appended claims.

I claim:

1. The combination in a machine of the class described, of a rotatable tool, compressed air operated means for producing a forward axial stroke of said tool, a holder for a work piece, and separate compressed air operated means operatively connected with said holder for operating said holder in unison with said forward movement of the tool to position the work piece with respect to the path of movement of the tool.

2. The combination in a machine of the class described, of a rotatable tool, compressed air operated means for producing a forward axial stroke of said tool, a holder for a work piece, compressed air operated means for holding said work piece in said work holder, and separate compressed air operated means operatively connected with said holder for actuating said holder to position said work piece with respect to the path of movement of said tool.

3. The combination in a machine of the class described, of a rotatable tool, compressed air operated means for producing a forward axial stroke of said tool, a holder for a work piece, separate compressed air operated means operatively connected with said holder for operating said holder in unison with said forward movement of the tool to position the work piece with respect to the path of movement of the tool, and a common means for controlling the actuation of both of said compressed air operated means.

4. The combination in a machine of the class described, of a rotatable tool, compressed air operated means for producing a forward axial stroke of said tool, a holder for a work piece, compressed air operated means for holding said work piece in said work holder, separate compressed air operated means operatively connected with said holder for actuating said holder to position said work piece with respect to the path of movement of said tool, and a single controlling means for effecting the simultaneous actuation of all of said compressed air operated means.

5. The combination in a machine comprising a rotatable tool, means for rotating said tool and means for producing periodic axial movements of said tool through forward and reverse strokes, of a rotary member having a socket to receive a work piece, compressed air operated means for holding a work piece in said socket, and means including a compressed air operated device for effecting the intermittent rotation of said rotary member in unison with the forward strokes of said tool.

6. The combination in a machine wherein a rotatable tool is moved through forward and reverse strokes, of a rotary shaft, a work holder mounted on said shaft and having a plurality of sockets adapted to receive work pieces, a ratchet wheel mounted on said shaft, a pivotally mounted air cylinder, a piston mounted in said cylinder, a ratchet lever connected to said piston and having pivotal movement about the axis of said shaft, and a pawl carried by said lever and engaging said ratchet wheel.

7. The combination in a machine wherein a rotatable tool is moved through forward and reverse strokes, of a rotary shaft, a socket member mounted on the end of said shaft and adapted to receive a work piece in axial alignment with said shaft, a ratchet wheel mounted on said shaft, compressed air operated means for actuating said ratchet wheel to rotate said work piece intermittently, and compressed air operated means for holding said work piece in said work holder.

8. The combination in a machine wherein a rotatable tool is moved through forward and reverse strokes, of a rotary shaft, a socket member mounted on the end of said shaft and adapted to receive a work piece in axial alignment with said shaft, a ratchet wheel mounted on said shaft, compressed air operated means for actuating said ratchet wheel to rotate said work piece intermittently, a cylinder mounted in axial alignment with said shaft, a plunger slidably mounted in said cylinder and adapted to engage said work piece to hold said work piece in said work holder, and means for admitting compressed air to said cylinder to actuate said plunger.

HERMAN GOLDBERG.

References Cited in the file of this patent

UNITED STATES PATENTS

| Number | Name | Date |
| --- | --- | --- |
| 1,578,232 | Ferris | Mar. 23, 1926 |
| 1,909,767 | Johnson et al. | May 16, 1933 |
| 1,947,348 | Lovejoy | Feb. 13, 1934 |
| 2,033,686 | Davis | Mar. 10, 1936 |
| 2,346,352 | Boxell | Apr. 11, 1944 |
| 2,379,028 | Morgenstein | June 26, 1945 |
| 2,390,649 | Hoffman et al. | Dec. 11, 1945 |
| 2,394,769 | Heckethorn | Feb. 12, 1946 |
| 2,415,037 | Redmer | Jan. 28, 1947 |
| 2,430,019 | Jenkins | Nov. 4, 1947 |
| 2,472,967 | Goldberg | June 14, 1949 |